United States Patent [19]
Ahmed

[11] Patent Number: 5,372,724
[45] Date of Patent: Dec. 13, 1994

[54] PROCESS FOR REMOVING TOXIC SULFUR-CONTAINING COMPOUNDS, AMMONIA, AND OIL AND GREASE FROM AN AQUEOUS SOLUTION

[75] Inventor: Saeed Ahmed, Signal Hill, Calif.

[73] Assignee: ECO Asphalt, Inc., a Calif. Corp., Tustin, Calif.

[21] Appl. No.: 129,989

[22] Filed: Sep. 30, 1993

[51] Int. Cl.$^5$ .......................... C02F 1/56; C02F 1/58; C02F 1/28
[52] U.S. Cl. ...................... 210/668; 210/669; 210/683; 210/721; 210/718; 210/729; 210/734; 210/774; 210/903; 210/916
[58] Field of Search .............. 210/708, 718, 721, 722, 210/724, 725, 726, 727, 728, 734, 735, 737, 766, 774, 750, 758, 668, 669, 683

[56] References Cited

U.S. PATENT DOCUMENTS

| | | | |
|---|---|---|---|
| 3,147,218 | 9/1964 | Booth et al. | 210/734 |
| 3,637,491 | 1/1972 | Hedrick et al. | 210/734 |
| 3,929,586 | 12/1975 | Slikkers, Jr. | 210/737 |
| 4,108,771 | 8/1978 | Weiss | 210/916 |
| 4,446,031 | 5/1984 | List | 210/916 |
| 4,961,859 | 10/1990 | Uehara et al. | 210/737 |
| 4,981,599 | 1/1991 | Stewart, Jr. | 210/734 |

*Primary Examiner*—Neil McCarthy
*Attorney, Agent, or Firm*—Stetina Brunda & Buyan

[57] ABSTRACT

A process for removing toxic sulfur-containing compounds, ammonia, oil and grease from an aqueous solution wherein the steps include sequentially adding to the solution sufficiently effective amounts of ferrous sulfate, ferric sulfate, and an insoluble hydrophilic amine polymer; heating the solution; removing the oil and grease as volatile organic compounds; and removing the contaminants from the solution as a precipitate complex. The resulting purified effluent may then be directly discharged into an industrial sewer.

8 Claims, 1 Drawing Sheet

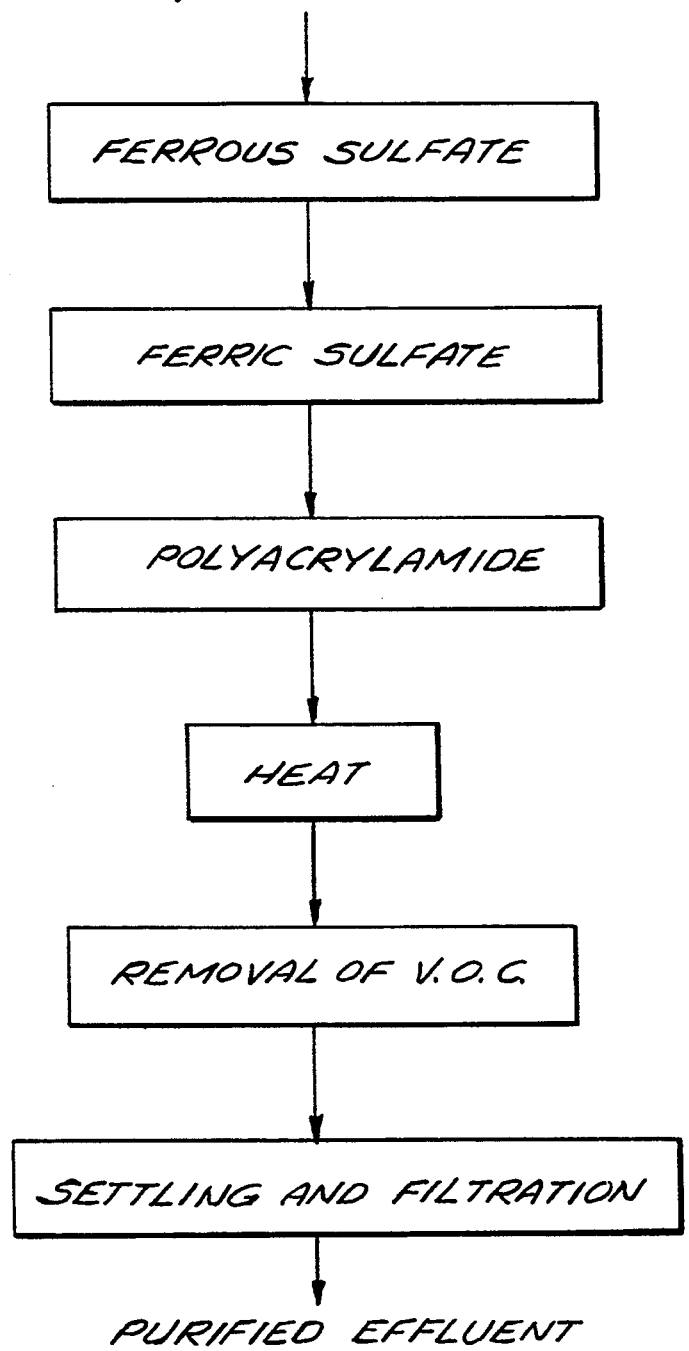

PROCESS FOR REMOVING TOXIC SULFUR-CONTAINING COMPOUNDS, AMMONIA, AND OIL AND GREASE FROM AN AQUEOUS SOLUTION

BACKGROUND OF THE INVENTION

The present invention is directed to a process for removing toxic sulfur-containing compounds, ammonia, oil and grease from an aqueous solution.

A common by-product of petroleum processing is wastewater contaminated with toxic sulfur-containing compounds, ammonia, oil and grease. This contamination arises through sulfur removal measures made in the refining process. This removal is essential to minimize the sulfur that remains in the refined petroleum fuel because of the resulting sulfur dioxide that is produced upon the eventual combustion of the product. Sulfur dioxide is problematic in this sense as it is a major precursor to acidic precipitation. However, the sulfur that has been isolated through the washing process remains in a wastewater solution.

With respect to sulfur removal in petroleum processing, an aqueous washing process is used to remove reduced sulfur compounds that are naturally present in crude oil. This washing process, which is well known to those skilled in the art, involves contacting the crude petroleum product with water and then by adding ammonia to the solution at a later stage. Through this process, the sulfur, which is usually in the form of hydrogen sulfide or thiosulfate, becomes extracted from the crude petroleum product. However, oil and grease become unavoidably introduced into the system by virtue of the washing process. Hence, the aqueous solution which serves as the basis for the present invention becomes generated.

The usual course of action is to treat the wastewater by-product as a toxic substance. The wastewater is toxic because of the hydrogen sulfide and other reduced sulfur compounds that are present. These compounds have the potential to inhibit cellular electron transport systems that are vital to respiration. Hence, such compounds can be deadly.

Unfortunately, the current methodology used in treating these toxic solutions is somewhat problematic. Not only is the solution toxic because of the hydrogen sulfide present in the aqueous solution, the solution is further contaminated because of the ammonia, oil and grease that are also present. Furthermore, the solution usually has a high pH of approximately 12.1 and is quite caustic in nature.

Accordingly, each toxic aspect of the solution must be treated separately. Currently, these solutions are treated in vapor-tight holding tanks where the solutions are held for a number of days and are subjected to numerous stripping procedures where the more volatile components of the solution are separated. In addition, the solution remains at a very high pH and cannot readily be disposed through traditional industrial sewage systems without first reducing the pH to more acceptable levels. Likewise, the chemical contaminants that remain in solution must undergo further chemical treatments so as to eliminate the toxic nature of these solutions.

Moreover, treating these solutions as toxic substances is extremely costly and requires great care in maintaining toxic effluent limitations. Both Federal and State laws are in effect that place numerous restrictions and procedures with respect to the discharge of toxic wastewater. Under these statutory provisions, industrial dischargers of toxic wastewater may be required to use the best-available technology in treating the solutions, regardless of cost effectiveness. Furthermore, failure to comply with statutory effluent limitations can subject an industrial discharger to private civil suits as well as injunctions, fines, and criminal penalties under state and federal enforcement provisions.

Attempts have recently been made to more effectively treat these aqueous wastewater solutions so as to avoid the problems mentioned above. The focus of these attempts has been on the oxidation of the sulfur through the addition of highly reactive oxidizing agents, such as permanganates and peroxides. However, because of the highly reactive nature of these compounds, a serious potential exists for hazardous and explosive reactions.

Accordingly, there is a need for a process that is capable of effectively and efficiently treating these wastewater solutions so that all contaminants present are converted into a less-toxic state. Furthermore, a need also exists for a method of removing these contaminants as well as reducing the pH levels of such solutions.

SUMMARY OF THE INVENTION

It has been found that most of the added expense in handling these toxic substances can be avoided by the present invention, which provides a process for simultaneously removing toxic sulfur-containing compounds, ammonia, oil and grease from industrial wastewater solutions as well as reducing the pH of such solutions so that the solutions no longer pose an environmental threat.

According to the invention, such process comprises basically and essentially the steps of contacting the solution with ferrous sulfate, ferric sulfate, and an insoluble hydrophilic amine polymer, respectively; heating the solution; removing the oil and grease as volatile organic compounds; and removing the polymer and any precipitates that may have formed. The process, quite unexpectedly, attains superior results in both converting the sulfur compounds into a much-less toxic sulfate form as well as containing the sulfur in a form that can easily be removed.

In addition, the process quite advantageously provides for the further removal of the ammonia. With respect to ammonia, the process provides for the conversion of the ammonia originally present into the ammonium form. Once in the ammonium form, the formation of ammonium sulfate occurs which, under the conditions present, precipitates out of solution as ammonium sulfate and as a result becomes easily and effectively removable.

Of still further advantage of the present invention is the additional removal of oil and grease that is present in the aqueous solution. The process allows for the oil and grease to be removed by means of the heating of the solution that occurs prior to the removal of the precipitate complex. By heating the solution, the oil and grease are converted into volatile organic compounds, and thus by means of a later step of the process, can be removed from the solution so as to create the added benefit of a more purified effluent product.

Of still further advantage of the present process, is the ability of the process to reduce the pH of the solution so that it is no longer exceedingly basic in nature. Through the series of reactions that are mentioned above, the overall pH of the solution favorably drops to lower levels that ultimately reach 7.0, or that of ordinary water. By significantly lowering the pH to 7.0, the solutions become well suited for immediate disposal into industrial sewage systems where no further treatment of the solution is required. This further advantageous aspect of the invention thus provides not only the means of detoxifying and separating the toxic contaminants of the solution, but readily provides for eliminating any further steps necessary to acidify the solution so as to reach normal pH values.

For further comprehension of the invention, and of the objects and advantages thereof, reference will be had to the following description and accompanying drawing, and to the appended claims in which the various novel features of the invention are more particularly set forth.

BRIEF DESCRIPTION OF THE DRAWING

FIG. 1 is a schematic diagram showing the sequential steps of the sulfur removal process in accordance with the present invention.

DETAILED DESCRIPTION OF THE PREFERRED EMBODIMENT

As set forth above, the process comprises a series of sequential steps for the removal of sulfur compounds, ammonia, oil and grease from aqueous solutions. The procedure and ingredients that are essential for accomplishing the desired results are preferably within the ranges or quantities per volume as set forth below:

ferrous sulfate: 5 grams per liter of solution (0.66 ounces per gallon)
ferric sulfate: 8 grams per liter of solution (1.1 ounce per gallon)
polyacrylamide: 0.1 grams per liter of solution (0.014 ounce per gallon)
heating temperature: 65.6° to 79.4° C. (150° to 175° F.)

Although a preferred method is indicated herein, there are no special requirements as to how the solution/mixture is heated. Likewise, all added ingredients are commercially available and require no special handling when used to practice the present invention.

Initially, the ferrous sulfate is added to provide catalytic means for the conversion of sulfur in its reduced form to a more oxidized state. In its original state, the solution contains high concentrations of both hydrogen sulfide and thiosulfate. The thiosulfate is present as an intermediate species of sulfur that has undergone incomplete oxidation. In addition to partially oxidizing the sulfur, the ferrous sulfate further acts to reduce the pH of the aqueous solution, which initially has a pH of approximately 12.1. This reduction in pH is useful in quaternizing the functional groups of the amine polymer when the polymer is added at a later stage. However, monitoring of pH is not required at any stage of the present invention.

In the next step, ferric sulfate is added to fully convert all species of sulfur to the sulfate form. While the previous addition of ferrous sulfate converts a portion of the reduced sulfur to the sulfate form, the remaining sulfur is only partially oxidized and exists in either thiosulfate form or in the originally reduced state, which, as mentioned above, is usually hydrogen sulfide. These remaining sulfur compounds thus undergo further and complete oxidation through the reaction of iron (III) with water, wherein the iron (III) reduces to iron (II) and forms a ferrous sulfate precipitate.

The addition of ferric sulfate is also essential to further lower the pH. As mentioned above, lowering the pH is necessary to quaternize the amine groups of the polymer added in the next step. However, the drop in pH is still of further benefit in that the drop in pH causes the ammonia that is present in the solution to convert to ammonium. Quite unexpectedly, the conversion of ammonia to ammonium gives rise to the formation of a ammonium sulfate precipitate. This ammonium sulfate precipitate is quite advantageous as it facilitates the removal of the ammonia that was once in the present solution. As a result, the effluent that is eventually produced achieves a much higher purity and requires significantly less secondary treatment.

It is also to be particularly noted that the formation of these ferric sulfate and ammonium sulfate precipitates advantageously further enhances the water purification abilities of the present invention as these precipitates can act as a coagulant effective to remove small particles by separate coagulation-flocculation processes.

The third step of the present invention provides for the addition of a hydrophilic, insoluble amine polymer to the aqueous solution mixture. The amine groups can exist in a quaternized state before being contacted with the mixture, but preferably should be added in an unquaternized state. Because of the reduction in pH that occurs due to the addition of both ferrous sulfate and ferric sulfate, the functional groups should readily quaternize and continue to exist in protenated form. Polyacrylamide is a preferred amine polymer.

Through the action of ion exchange between the quaternized amine groups on the polymer and free sulfate, as well as through the formation and coagulation of both ferrous sulfate and ammonium sulfate precipitates, the sulfate becomes isolated and separable. Essentially all of the sulfate, as well as any iron or ammonia originally in the solution, is confined to the polymer/precipitate complex that drops out of the solution as a solid. This polymer/precipitate complex should form approximately 13.2 grams of solid material per liter (1.76 ounces per gallon), and can then be removed in the final step through settling and filtration.

However, prior to the removal of the solids, a fourth step of heating the solution is performed. This step of heating may be performed numerous ways with a preferred embodiment utilizing a heat exchanger whereby the solution is passed across a heated surface so as to rapidly increase the temperature of the solution. Preferably, the solution should be heated to 79.4° C. (175° F.) so as to cause the oil and grease components of the solution to convert to volatile organic compounds. By converting the oil and grease into volatile organic compounds, the process advantageously allows for their eventual separation from the solution through an additional step of removing these compounds while in this volatile state. In a preferred embodiment, these volatile organic compounds may be removed through means of refrigeration condensation or alternatively, may be removed by contacting the solution with activated carbon.

Upon attaining the temperature that is sufficient to cause the formation of volatile organic compounds and thus allow for removal of the compounds, the temperature may then be cooled. While neither rapid cooling nor significant cooling is required, a preferred embodiment of the present invention allows for the solution to be dropped in temperature to approximately 60° C. (140° F.). This minor reduction in temperature is provided so as to reduce the solubility of any precipitates that have formed so as to keep the precipitates confined to the polymer/precipitate complex.

Upon completion of the heating of the solution and subsequent removal of the volatile organic compounds, the remaining solids may then be removed through settling and filtration as mentioned above. The remaining aqueous solution may be disposed of and treated through conventional industrial sewage water treatment procedures.

There has thus been provided a process for removing toxic sulfur compounds, ammonia, and grease and oil from a basic aqueous solution. Although each step of the process is distinct, the overall process may be carried out through rapid succession of each step mentioned. While a preferred embodiment of the invention has been described, it will be understood by those skilled in the art that modifications may be made to the disclosed embodiment without departing from the scope of the invention, which is defined by the appended claims.

What is claimed is:

1. A process for removing hydrogen sulfide, ammonia, oil and grease from an aqueous solution comprising the steps of:
   (a) adding ferrous sulfate to the aqueous solution to form a first admixture wherein said ferrous sulfate is present at a concentration sufficient to convert portion of the contained hydrogen sulfide to hydrogen sulfate;
   (b) adding ferric sulfate to the first admixture to form a second admixture wherein said ferric sulfate is present at a concentration sufficient to convert all remaining hydrogen sulfide to hydrogen sulfate;
   (c) adding a hydrophilic, insoluble polymer having quaternary ammonium groups as functional groups to the second admixture to form a third admixture wherein said polymer is suspended in a concentration sufficient to adsorb any dissolved sulfate in the third admixture;
   (d) heating the third admixture to a temperature sufficient to volatilize the contained oil and grease;
   (e) removing the volatilized oil and grease from the third admixture; and
   (f) removing the polymer and all remaining solid compounds from the third admixture.

2. The method of claim 1 wherein the functional groups of the polymer in step (c) are not protonated when the polymer is added to the second admixture.

3. The method of claim 2 wherein the polymer added to the second admixture is polyacrylamide.

4. The method of claim 3 wherein:
   (a) the amount of ferrous sulfate to be added in step (a) is at least 5 grams per liter of solution;
   (b) the amount of ferric sulfate to be added in step (b) is at least 8 grams per liter of solution;
   (c) the amount of polyacrylamide to be added in step (c) is at least 0.1 grams per liter of solution; and
   (d) the third admixture is heated in step (d) from 65.6° to 79.4° C.

5. The method of claim 4 wherein the removal of the volatile organic compounds from the third admixture in step (e) is achieved through refrigeration condensation.

6. The method of claim 4 wherein the removal of the volatile organic compounds from the third admixture in step (e) is achieved through application of activated carbon.

7. The method of claim 4 wherein the aqueous solution has an initial pH of approximately 12.1 or higher.

8. The method of claim 5 wherein the aqueous solution further contains thiosulfate.

* * * * *